(12) United States Patent
Sivanandan et al.

(10) Patent No.: US 9,012,598 B2
(45) Date of Patent: Apr. 21, 2015

(54) POLY(ETHYLENEOXIDE) FUNCTIONALIZATION THROUGH ALKYLATION

(71) Applicant: Seeo, Inc, Hayward, CA (US)

(72) Inventors: Kulandaivelu Sivanandan, Fremont, CA (US); Hany Basam Eitouni, Oakland, CA (US); Yan Li, Fremont, CA (US); Russell Clayton Pratt, Foster City, CA (US)

(73) Assignee: Seeo, Inc., Hayward, CA (US)

( * ) Notice: Subject to any disclaimer, the term of this patent is extended or adjusted under 35 U.S.C. 154(b) by 39 days.

(21) Appl. No.: 13/946,924

(22) Filed: Jul. 19, 2013

(65) Prior Publication Data
US 2014/0039152 A1   Feb. 6, 2014

Related U.S. Application Data

(60) Provisional application No. 61/678,486, filed on Aug. 1, 2012.

(51) Int. Cl.
*C08G 65/337* (2006.01)
*C08G 65/333* (2006.01)
*C08G 65/336* (2006.01)
*C08G 65/34* (2006.01)

(52) U.S. Cl.
CPC ........ *C08G 65/337* (2013.01); *C08G 65/33324* (2013.01); *C08G 65/336* (2013.01)

(58) Field of Classification Search
CPC .................................................... C08G 65/337
USPC .......... 528/405, 408, 409, 488, 495, 497, 482
See application file for complete search history.

(56) References Cited

PUBLICATIONS

Yokoyama M, et.al., "Synthesis of Poly(ethylene oxide) with Heterobifunctional Reactive Groups at Its Terminals by an Anionic Initiator," Bioconjugate Chemistry 1992, 3, 275-276.

*Primary Examiner* — Duc Truong
(74) *Attorney, Agent, or Firm* — R'Sue Popowich Caron

(57) ABSTRACT

A new and efficient method of functionalizing high molecular weight polymers through alkylation using a metal amide base is described. This novel procedure can also be used to synthesize polymer-based macro-initiators containing radical initiating groups at the chain-ends for synthesis of block copolymers.

10 Claims, No Drawings

POLY(ETHYLENEOXIDE) FUNCTIONALIZATION THROUGH ALKYLATION

CROSS-REFERENCE TO RELATED APPLICATIONS

This application claims priority to U.S. Provisional Patent Application 61/678,486, filed Aug. 1, 2012, which is incorporated by reference herein.

STATEMENT OF GOVERNMENT SUPPORT

The invention described and claimed herein was made in part utilizing funds supplied by the U.S. Department of Energy under Contract No. DE-OE0000223. The Government has certain rights in this invention.

BACKGROUND OF THE INVENTION

Field of the Invention

The invention is directed generally to a method of functionalizing hydroxyl-containing high molecular weight polymers (HMP-OH) by alkylation using a substituted metal amide (MAd) base. The novel scheme disclosed herein can also be used to synthesize PEO-based macro-initiators for controlled radical polymerizations.

Nanostructured polyelectrolytes can be used in lithium batteries to improve safety and cycle-life by restricting lithium-ion transport to ionically-conductive lamellar domains. Such a structure can be made through the self-assembly of di- or tri-block copolymers containing at least two distinct phases—a hard, structural phase and a soft, ionically conductive phase. The soft phase, which can be PEO or PEO-based, provides a nano-domain for lithium ion transport; the hard phase, usually a high $T_g$ polymer, provides a nano-domain for mechanical stability in the polyelectrolyte thin film and prevents formation of lithium dendrites that can otherwise grow from anode to cathode, shorting the battery. An example of such a PEO-based polyelectrolyte is PS-b-PEO-b-PS tri-block copolymer, where polystyrene (PS), the hard component, phase separates from PEO, the ionically conductive component, to form a nanostructured block copolymer electrolyte for a lithium battery.

It has been difficult to establish a synthetic route to produce such block copolymers on an industrial scale, especially a route that is reproducible, safe, and economical. Generally, block copolymers based on PEO are grown from PEO-based macro-initiators, which in turn are obtained from $\alpha,\omega$-dihydroxy PEO. Most commonly, PEO-based macro-initiators are generated by a simple esterification of the terminal hydroxyl groups with an acid halide in the presence of a mild base such as triethylamine ($Et_3N$). For example, reaction of $\alpha$-bromoisobutyryl bromide with OH-PEO-OH in the presence of $Et_3N$ results in a macro-initiator with $\alpha$-bromoisobutyryl groups at the chain-ends. The reaction is highly exothermic, so it can be performed using relatively low temperatures and short times and still produce substantial yields. Once the macro-initiator is in place, a variety of vinyl monomers can be polymerized through atom transfer radical polymerization (ATRP) to generate various triblock copolymers. Unfortunately, the ester linker obtained through this method is susceptible to hydrolysis even under mild acid or basic conditions. In addition, a block copolymer electrolyte containing an ester group will readily degrade when in contact with lithium metal, which is a strong reducing agent, making electrolytes produced in this way unsuitable for lithium batteries.

Another method for synthesizing PEO macro-initiators is to terminate a living chain PEO using an electrophilic initiator such as $\alpha$-bromoisobutyryl bromide (See Mahan, S. et. al. *Macromol. Chem. Phys.* 2003, 204, 1047-1055). This also produces an ester linker between the polymer components, making it unsuitable for synthesis of electrolytes for lithium batteries.

An ether linker is more robust when compared to an ester group but is not as easy to synthesize because formation of an ether bond requires a stronger base and more stringent conditions (e.g., longer reaction times, elevated temperatures) than for an ester bond. In addition, high molecular weight polymers may degrade during such high temperature processing conditions.

There are several reactions that are known to produce PEO macro-initiators using ether linkers, but there are drawbacks to most of these. For example, commonly used hydroxides for alkylation of PEO, potassium hydroxide (KOH) and sodium hydroxide (NaOH), are soluble only in polar solvents such as DMF, DMSO, water, and methanol. After alkylation, removal of such polar solvents and excess hydroxides from functionalized PEO is very difficult even after several stages of purifications.

PEO can also be alkylated using hydrides such as sodium hydride (NaH) (See Bosman, A. W.; Frechet, J. M. N.; Hawker, C. J. *Polym. Mater. Sci. Eng.* 2001, 84, 376) and potassium hydride (KH); however, these reagents are pyrophoric and are unsafe for use in large-scale manufacturing. Also, removal of hydroxides, a byproduct of alkylation using hydrides, from PEO is extremely difficult.

Similarly, organo-metallic bases such potassium naphthalenide and diphenylmethyl potassium that are synthesized in-situ from the highly pyrophoric potassium metal can be used for PEO alkylation. These bases are highly reactive and flammable when exposed to air and are not commercially available, making them extremely poor candidates for alkylation on a large scale.

What is needed is an organic base for alkylation of PEO with radical initiating groups that is highly soluble in common organic solvents, effective, safe, inexpensive, readily available, and appropriate for functionalization of PEO on a commercial scale. Most importantly, the base should not affect the stability of PEO.

SUMMARY

In one embodiment of the invention, a method of functionalizing a high molecular weight polymer (HMP-OH) comprises the steps of: a) dissolving the HMP-OH in a first solvent and reacting with a metal amide (MAd); b) adding RX; c) adding the mixture to a second solvent (the second solvent is capable of dissolving the MAd, the RX, and any reaction byproducts from steps a and b); and d) precipitating HMP-O-R from the solution formed in step c). In one arrangement, the HMP-OH has a molecular weight between about 1 and 500 Kg mol$^{-1}$.

In one embodiment of the invention, HMP-OH comprises a hydroxyl group. In another embodiment of the invention, the HMP-OH is selected from the group consisting of polymers containing hydroxyl group such as poly(ethyleneoxide), poly(propyleneoxide), poly(tetrahydrofuran), $\alpha,\omega$-dihydroxy poly(styrene), $\alpha,\omega$-dihydroxy polybutylene, $\alpha,\omega$-dihydroxy polyisoprene, poly(hydroxystyrene), poly(hydroxyethylacrylate), poly(hydroxymethylstyrene), and poly(vinylalcohol).

In one embodiment of the invention, the MAd is a base such as lithium bis(trimethylsilylamides), sodium bis(trimethylsilylamides), and potassium bis(trimethylsilylamides).

In one embodiment of the invention, the first solvent is any one or more of THF, DMF, toluene, DMSO, cyclohexanone, xylene, and benzene; and the second solvent is any of ethanol, 2-propanol, 1-propanol, 1-butanol, 2-butanol, and tert-butanol.

In one embodiment of the invention the RX is an alkyl halide that comprises a functional group such as a photoactive group, an electroactive group, a controlled radical polymerization initiator, a monomer, a reactive alkene/olefin, a click functionality, or a biochemical group for conjugation to biological molecules.

In one embodiment of the invention the X in RX can be one or more of fluorides, chlorides, bromides, iodides, triflates, mesylates, tosylates, and N-oxysuccinimides.

In one embodiment of the invention the second solvent can be one or more of ethanol, 2-propanol, 1-propanol, 1-butanol, 2-butanol, and tert-butanol.

DETAILED DESCRIPTION

The preferred embodiments are illustrated in the context of functionalization of high molecular weight PEO (HMPEO). The skilled artisan will readily appreciate, however, that the materials and methods disclosed herein will have application in a number of other contexts where functionalization of high molecular weight polymers is desired, particularly where safety and cost are important.

All publications referred to herein are incorporated by reference in their entirety for all purposes as if fully set forth herein.

In the embodiments described herein, the term "high molecular weight" is used to mean molecular weights between about 1 and 500 Kg mol$^{-1}$.

Abbreviations

The following chemical abbreviations are used throughout this disclosure:

| Abbreviation | Chemical Name |
| --- | --- |
| HMP-OH | Hydroxyl-containing high molecular weight polymers |
| HMP-OR | Alkylated high molecular weight polymers |
| MAd | Metal amide |
| PEO | Polyethyleneoxide |
| HMPEO | Hydroxyl-containing high molecular weight PEO |
| HMPEO-R | Alkylated high molecular weight PEO |
| THF | tetrahydrofuran |
| DMF | dimethylformamide |
| DMSO | dimethyl sulfoxide |
| EO | ethylene oxide |
| KHMDS | potassium bis(trimethylsilyl)amide or potassium hexamethyldisilyl amide |
| KOH | potassium hydroxide |
| NaOH | sodium hydroxide |
| PS | polystyrene |

In one embodiment of the invention, a metal amide (MAd) is used as the base in a reaction to functionalize HMPEO and other high molecular weight polymers (HMP-OH) with ether linkers. This novel scheme can be used to synthesize PEO-based macro-initiators containing radical initiating groups at the chain-ends. MAds are highly soluble, commercially available bases that are less reactive and less dangerous when compared to the metal hydrides and organometallic bases. In addition, due to their high solubility, MAd bases enable efficient functionalization of PEO even in non-polar solvents.

MAd bases have not previously been used to etherify PEO or other high molecular weight polymers (HMP-OH). MAd is nitrogen centered, highly basic, sterically-protected bulky base. It is a poor nucleophile due to the presence of bulky solubilizing groups. It is its basicity that is used to deprotonate the hydroxyl groups in PEO and favor alkylation in the methods described herein.

In one embodiment of the invention, a solution of HMPEO in anhydrous solvent is treated with an excess amount of MAd (solution in anhydrous solvent) and allowed to react for about 30 minutes to 48 hours at a temperature between about 20° C. and 65° C. The term "excess amount" refers to more than the stoichiometric amount that would be required for the reaction. In another arrangement, the reaction time is between about 2 hours and 24 hours, and the temperature is between about 25° C. and 60° C. In yet another arrangement, the reaction time is between about 3 hours and 10 hours and the reaction temperature is about 55° C. In one arrangement there are between about one and 20 equivalents of MAd per PEO chain. In another arrangement, there are between about four and 15 equivalents of MAd per PEO chain. In yet another arrangement there are about 12 equivalents of MAd per PEO chain. Then a solution of RX (where R is an alkyl group and X can be a halide or other leaving group) in an anhydrous solvent is added to the MAd-PEO solution and the reaction proceeds for about 1 to 48 hours. The reaction (shown as (1)) results in the alkylation of HMPEO to form HMPEO-R. The functionalized polymer is then isolated by precipitation. This is accomplished by adding the polymer solution to a solvent which dissolves the MAd, the RX, and any reaction byproducts but which does not dissolve the HMPEO-R. The solid HMPEO-R is then collected and dried. As described above and in reaction (1), the HMPEO is difunctional. It should be understood that an analogous reaction can occur for HMPEO that is monofunctional, i.e., has only one —OH group.

(1)

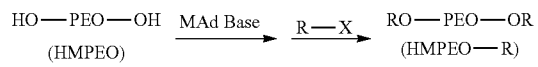

R = Functional group
X = Leaving group

In one embodiment of the invention, the anhydrous solvent is chosen based on its ability to solublize the HMP-OH and MAd. Examples include, but are not limited to one or a mixture of THF, DMF, toluene, DMSO, cyclohexanone, xylene, and benzene.

In one embodiment of the invention, the precipitation is performed in a solvent which dissolves the MAd, the RX, any reaction byproducts, but not the HMP-OR. Examples include, but are not limited to ethanol, 2-propanol, 1-propanol, 1-butanol, 2-butanol, and tert-butanol.

In another embodiment of the invention, this reaction described above can also be used for the functionalization of hydroxyl (—OH) groups in polymers other than PEO. Examples include, but are not limited to poly(propyleneoxide), dihydroxy telechelic polymers such as α, ω-dihydroxy poly(styrene), α, ω-dihydroxy polybutylene, and α, ω-dihydroxy polyisoprene. Polymers containing pendant hydroxyl groups can also be functionalized through this method. Examples of such polymers include, but are not limited to poly(vinyl alcohol), poly(4-hydroxystyrene) poly(hydroxymethylstyrene), and poly(hydroxyethylacrylate). Polymers containing one or several hydroxyl groups, as well as small molecule alcohols and oligomers containing hydroxyl groups can also be functionalized through alkylation using a MAd base.

The basicity of MAd can be varied by changing the metal cation (i.e., M of MAd). Possible metal cations include, but are not limited to lithium (Li), sodium (Na), potassium (K), cesium (Cs), and zinc (Zn). Examples of resulting MAds are lithium bis(trimethylsilylamides), sodium bis(trimethylsilylamides), and potassium bis(trimethylsilylamides). For deprotonating polymers with high acidic protons (such as phenols), a weaker base can be used. Using a weaker base is less likely to result in unwanted side reactions.

In another embodiment of the invention, amides with different substituents on nitrogen can be utilized to tune the basicity and solubility of MAd. In one arrangement, silyl groups with different aliphatic substituents such as bis(trimethylsilyl), bis(triethylsilyl) or their combination can impart different properties to MAd. Similarly, different alkyl substituents on nitrogen such as dimethyl, diethyl di-isopropyl are other possibilities. A combination of alkyl and silyl substituted amides such as N-2-(2,2,5,5-tetramethyl-1-aza-2,5-disilacyclopentyl)-ethylmethylamine (reference: Kim, Y, J.; Nagasaki, Y.; Kataoka, K.; Kato, M.; Yokoyama, M.; Okano, T. et. al *Polymer Bulletin* 1994, 33, 1-6) is yet another possibility. Unsubstituted amides such as sodium amide, lithium amide can also be used as MAd base; however, their solubility is very poor in non-polar solvents.

A variety of R groups such as aliphatic, aromatic, cyclic, acyclic, branched hydrocarbons, monomers, or reactive alkenes/olefins can be introduced in HMP-OH using this procedure. Other possibilities include substituted aromatic or heterocyclic functional groups such as pyridine, thiophene, furan, and indole; photoactive units such as pyrene, anthracene, and dansyl; electroactive units such as ferrocene and viologen; bioactive molecules such as biotin and avidin for bio-conjugation.

Introduction of controlled radical initiating groups such α-bromoisobutryl, 4-(2-bromoethyl)phenyl (ATRP initiators), dithiocarbonates (RAFT initiator), N-tert-Butyl-O-[1-[4-(chloromethyl)phenyl]ethyl]-N-(2-methyl-1-phenylpropyl)hydroxylamine (TIPNO) (NMP initiators) are also possible. Such HMP-OR can be used as a precursor to synthesize block copolymers, dendronized block copolymers and other interesting architectures.

HMP-OH based macromonomers can be synthesized by incorporating vinyl monomers such as styrene, acrylate, and methacrylate; cyclic monomers such as lactone and oxazoline.

Click functionalities such as acetylene, ethylene, cyclic acetylene, azides, thiols, cyclopentadiene, anthracene, meliemide, and furan can also be incorporated in to polymers using this method.

In another embodiment of this invention, the reactivity of RX can be altered by changing the leaving group (X) such as fluoride, chloride, bromide, iodide, tosylate, mesylate, triflate, esters, N-oxysuccinimide and other commonly used leaving group.

EXAMPLE

The following example provides details relating to composition, fabrication and performance characteristics of block copolymer electrolytes in accordance with the present invention. It should be understood the following is representative only, and that the invention is not limited by the detail set forth in this example.

Functionalization of OH-PEO-OH: KHMDS solution (0.75 mL, 1M) was added slowly to a solution of PEO-diol (15 g, 0.07 mmol) in 125 mL of THF at 65° C. and then stirred for 6 hours. A solution of benzyl bromide (0.12 g, 0.7 mmol) in THF (2.0 mL) was added to the solution drop-wise. The new mixture was stirred for about another 48 hours to ensure the PEO functionalization reaction was complete. The functionalized PEO was isolated by precipitation in 2-propanol (1250 mL) to ensure complete removal of the excess reagents. Finally, the macro-initiator product was filtered and dried under high vacuum to obtain 14.9 g of functionalized material. The molecular weight determined by end group analysis was 191 Kg mol$^{-1}$ as determined from 500 MHz $^1$H NMR, confirming complete functionalization.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method of functionalizing a high molecular weight polymer (HMP-OH) comprising the steps of:
    a. dissolving the HMP-OH in a first solvent and reacting with a metal amide (MAd), to form a first solution;
    b. adding RX to the first solution to form a second solution, wherein R is an alkyl group and X is a leaving group;
    c. adding the second solution to a second solvent to form a third solution, wherein the second solvent is capable of dissolving the MAd, the RX, and any reaction byproducts from steps a and b; and
    d. precipitating HMP-O-R from the third solution.

2. The method of claim 1 wherein the HMP-OH has a molecular weight between about 1 and 500 Kg mol$^{-1}$.

3. The method of claim 1 wherein the HMP-OH comprises hydroxyl groups.

4. The method of claim 1 wherein the HMP-OH is selected from the group consisting of poly(ethyleneoxide), poly(propyleneoxide), poly(tetrahydrofuran), α, ω-dihydroxy poly (styrene), α, ω-dihydroxy polybutylene, α, ω-dihydroxy polyisoprene, poly(hydroxystyrene), poly(hydroxyethylacrylate), poly(hydroxymethylstyrene), and poly(vinylalcohol).

5. The method of claim 1 wherein the MAd is selected from the group consisting of lithium bis(trimethylsilylamides), sodium bis(trimethylsilylamides), and potassium bis(trimethylsilylamides).

6. The method of claim 1 wherein the first solvent is selected from the group consisting of THF, DMF, toluene, DMSO, cyclohexanone, xylene, benzene, and combinations thereof.

7. The method of claim 1 wherein the RX is an alkyl halide and the alkyl halide comprises a functional group selected from the group consisting of photoactive groups, electroactive groups, controlled radical polymerization initiators, monomers, reactive alkenes/olefins, click functionalities, and biochemical groups for conjugation to biological molecules.

8. The method of claim 1 wherein the X in RX is selected from the group consisting of fluorides, chlorides, bromides, iodides, triflates, mesylates, tosylates, and N-oxysuccinimides.

9. The method of claim 1 wherein the second solvent is selected from the group consisting of ethanol, 2-propanol, 1-propanol, 1-butanol, 2-butanol, and tert-butanol.

10. A method of functionalizing a high molecular weight polymer (HMP-OH) comprising the steps of:
   a. dissolving the HMP-OH in a first solvent and reacting with a metal amide (MAd), to form a first solution;
   b. adding RX to the first solution to form a second solution;
   c. adding the second solution to a second solvent to form a third solution, wherein the second solvent is capable of dissolving the MAd, the RX, and any reaction byproducts from steps a and b; and
   d. precipitating HMP-O-R from the third solution;
      wherein the RX is an alkyl halide and the alkyl halide comprises a functional group selected from the group consisting of photoactive groups, electroactive groups, controlled radical polymerization initiators, monomers, reactive alkenes/olefins, click functionalities, and biochemical groups for conjugation to biological molecules.

* * * * *